United States Patent [19]

Barouh et al.

[11] Patent Number: 4,600,372

[45] Date of Patent: Jul. 15, 1986

[54] POSITIONING SYSTEM FOR MOLDING PLASTIC DRIVE GEAR

[76] Inventors: Victor Barouh, 11 Wheatley Rd.; Seth Dinsky, 4 Deepwood Ct., both of Old Westbury, N.Y. 11568

[21] Appl. No.: 767,591

[22] Filed: Aug. 20, 1985

[51] Int. Cl.⁴ .............................. B29F 1/10; B29C 1/00
[52] U.S. Cl. ................................ 425/128; 425/129 R; 425/123; 249/83; 249/142; 249/160
[58] Field of Search .................... 249/57, 63, 64, 67, 249/68, 83, 160, 162, 142, 144; 425/110, 116, 117, 123, 124, 126 R, 127, 128, 129 R

[56] References Cited

U.S. PATENT DOCUMENTS

| | | | |
|---|---|---|---|
| 2,030,132 | 2/1936 | Apple | 425/128 |
| 2,222,755 | 11/1940 | Watson | 425/128 |
| 2,983,958 | 5/1961 | Foy | 425/123 X |
| 3,254,372 | 6/1966 | Hofbauer | 425/129 R X |
| 3,293,694 | 12/1966 | Taylor | 425/129 R X |
| 3,362,675 | 1/1968 | Ferdig | 249/160 X |
| 3,496,611 | 2/1970 | Ferdig | 249/142 X |
| 3,557,270 | 1/1979 | Waid | 425/129 R X |
| 3,584,345 | 6/1971 | Beastrom | 425/129 |
| 3,933,334 | 1/1976 | Edwards | 249/57 |
| 4,093,413 | 6/1978 | Schöllhorn et al. | 425/128 X |
| 4,415,513 | 11/1983 | Plachy | 249/83 X |

*Primary Examiner*—J. Howard Flint, Jr.
*Attorney, Agent, or Firm*—Lackenbach Siegel Marzullo Presta & Aronson

[57] ABSTRACT

A system for mounting a gear member having gear teeth tilted in one direction onto a core pin of a mold. The gear member is a part of a drive gear member that rotates a pick-up spindle of a used ribbon in a cassette. The gear forms a center hole having a rim that has at least three keys that are adapted to slide upon at least three keyways formed by the core pin. The keys are positioned at such angular distance that a mirror image of the metal key member and the keys would not be adapted to be received by the keyways of the core pin.

14 Claims, 11 Drawing Figures

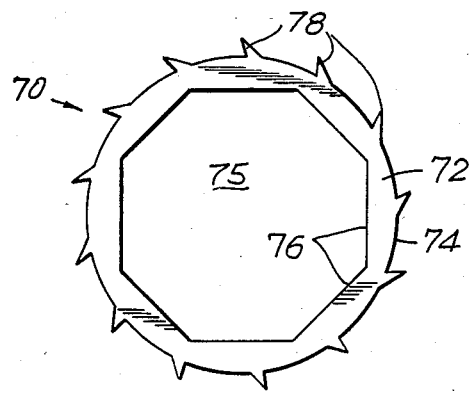
FIG. 5
PRIOR ART
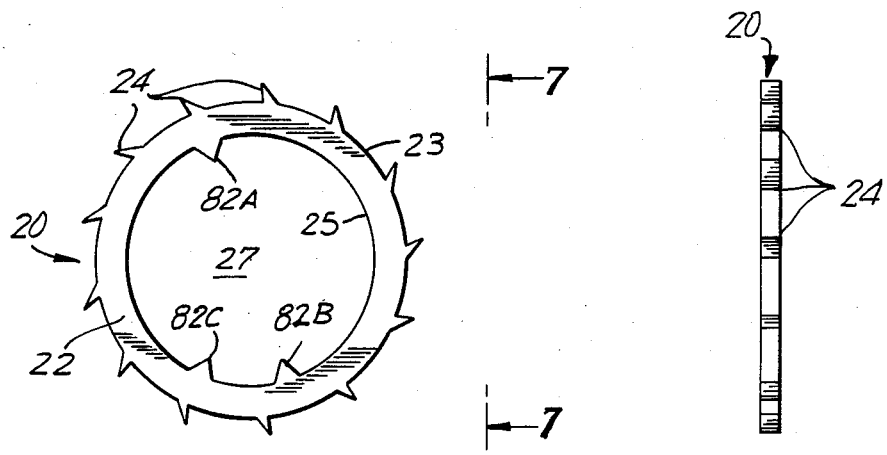
FIG. 6
FIG. 7

POSITIONING SYSTEM FOR MOLDING PLASTIC DRIVE GEAR

BACKGROUND OF THE INVENTION

This invention relates generally to positioning a gear member onto a core pin in preparation for molding a plastic drive gear, and particularly to increasing the efficiency of mounting the gear member onto the core pin in preparing the mold for the molding process.

The teeth of certain gears are oriented in one direction so as to provide a biting grip into the driven part. Typically, the driven part is not a gear but a take-up spindle. A particular case is the take-up spindle for a correctable ribbon cassette. A ratchet mechanism of the drive gear is rotated by a mechanism of the printer or typewriter while the used ribbon of the take-up spindle is pressed by biasing means into the gear teeth of the drive gear, thus causing the take-up spindle to rotate and to draw the unused ribbon from the supply spindle. In order to achieve reliable operation, the teeth of the drive gear are both pointed and angled, or tilted, in the direction of rotation so as to achieve maximum bite into the used ribbon around the take-up spindle.

The manufacture of the plastic drive gear is done by molding machine with a hollow metal gear being mounted by hand upon a core pin. The metal gear is stamped in a prior process. The interior rim of the hollow metal gear is configured as is the exterior of the core pin so as to prevent rotation of the metal gear during molding, for example, an octagonal configuration. The hollow metal gear is picked from a tray by hand and oriented by eye and then mounted to the core pin. The cavity of the molding machine is then activated so as to form the drive gear with the plastic embedded around the metal gear. The finished plastic drive gear with its embedded metal gear is then removed from the mold, finally checked for orientation of teeth tilt, and then passed for assembly with the correctable ribbon cassette.

The molding machine used for the process described is generally a vertical machine with the core on the bottom and the cavity on the top with the core pin vertically positioned so that the metal gear does not slide away from its stop in the molding process. Vertical molding machines are by far the least common molding machines as compared to horizontal molding machines and, therefore, are significantly more expensive than horizontal molding machines.

From the above description of the molding procedure, certain problems are apparent. First, the orientation of the metal gear teeth prior to placement on the core pin takes time. Second, it is easy to make a mistake in the placement of the metal gear teeth upon the core pin with the result that the tilt of the gear teeth are oriented in the wrong direction. Third, because the gear teeth are very small, it is difficult to spot every core of incorrect orientation of teeth tilt. Fourth, after the assembly of a drive gear with a cassette with the gear teeth reversed, the only occasion for discovery of the mistake is after purchase of the cassette and installation into a printing machine at which time malfunctioning of the machine will occur. Return of the cassette and discarding of the entire cassette will be the end results.

SUMMARY OF THE INVENTION

Accordingly, it is the principal object of the present invention to provide a hollow metal gear for a plastic drive gear and a core pin adapted to receive the metal gear with the tilt of the gear teeth in only one direction so that mistake in the direction of the tilt of the gear teeth in the finished product will be eliminated.

It is another object of the present invention to provide a hollow metal gear for a plastic drive gear and a core pin adapted to receive the metal gear with the gear teeth tilted in only the proper direction so that the production employee can quickly and without close checking mount the hollow metal gear onto the core pin in the proper direction.

It is yet another object of the present invention to provide a hollow metal gear and core pin that are adapted to mount the metal gear in a finished plastic drive gear with the gear teeth being tilted in the direction of rotation of the drive gear so that checking of the tilt of orientation of the gear teeth after molding can be eliminated.

It is yet another object of the present invention to provide a hollow metal drive gear having a plurality of keys and a core pin forming a plurality of keyways that allow receiving of the keys in only one orientation of the metal gear so that the tilt of the gear teeth is automatically positioned correctly on the finished molded drive gear.

It is still another object of the present invention to provide a core pin for holding a hollow metal gear that is capable of being press fitted onto the core pin so as to keep the hollow metal gear from sliding along the core pin during the molding process, so that the molding machine can be a horizontal molding machine.

In accordance with the invention, there is disclosed an improved system for molding a plastic drive gear member having gear teeth tilted toward the direction of rotation of the drive gear member comprising a source of hot liquid plastic, a mold having core means and cavity means, the core means being for shaping one portion of the drive gear member, the cavity means being associated with the core means and being for combining with the core means for shaping the other portion of the drive gear member and for receiving the liquid plastic from the source of hot liquid plastic and for passing the hot liquid plastic to the core means during the molding of the drive gear member upon activation of the cavity means to combine with the core means. The system includes delivery means for passing the hot liquid plastic from the source to the cavity means upon activation of the cavity means. Power is provided for driving the cavity means. The gear member has an inner rim forming a hole and the core means includes a core pin adapted to mount the gear member in close relationship at the gear inner rim in non-rotatable alignment. The invention in particular provides first alignment means formed by the core pin, and second alignment means formed on the gear member cooperating with the first alignment means during the mounting of the gear member around the cylindrical core pin, the first and second alignment means being for aligning the gear member with the core member so that the gear teeth can be tilted only toward the direction of rotation of the drive gear member when the drive gear member is mounted in the cassette.

The drive gear member has an axis of rotation, and the core means includes a rear wall. The core pin has opposed inner and outer ends, the inner end being connected to the core wall and the outer end being spaced from the core wall facing the cavity means. The core pin has a pin axis perpendicular to the core wall and is aligned with the axis of rotation of the drive gear member upon formation of the drive gear member. The core pin has an outer surface. The first alignment means is a plurality of keyways formed at the outer surface in separate planes with the pin axis extending between the outer end and a position spaced from the inner end.

The gear member has an outer rim, and the tilted gear teeth are positioned at the outer rim. The second alignment means is a plurality of keys positioned at the inner rim and capable of being slidably positioned in the plurality of keyways. The plurality of keys is positioned at such angular distances from one another so that the plurality of keys are adapted to slide into the plurality of keyways wherein the teeth are tilted in only the direction of rotation of the drive gear member when positioned in the cassettes. The mirror image of the plurality of keys is unable to match with the plurality of keyways, whereby the gear member is capable of being mounted onto the core pin in only one direction.

The plurality of keys and the plurality of keyways are at least three keys and three keyways, the keys and the keyways each having a three-way alignment so that the three angular distances between the keys and between the keyways are different from one another, so that a mirror image of the three-way alignment of the three keys cannot be matched with the three-way alignment of the keyways.

The present invention will be better understood and the main objects and important features will become apparent when consideration is given to the following details and description, which, when taken in conjunction with the annexed drawings, describes, discloses, illustrates and shows the preferred embodiments or modifications of the present invention and what is presently considered and believed to be the best mode of practice in the principles thereof. Other embodiments or modifications may be suggested to those having the benefit of the teachings herein and such other embodiments or modifications are intended to be reserved especially as they fall within the scope and spirit of the subjoined claims.

BRIEF DESCRIPTION OF THE DRAWINGS

FIG. 5 is a front view of a prior art hollow metal gear;

FIG. 6 is a front view of a hollow metal gear of the present invention.

FIG. 7 is a side view of the metal gear taken through line 7—7 of FIG. 6;

DETAILED DESCRIPTION OF THE PREFERRED EMBODIMENT

Figures 1, 2:
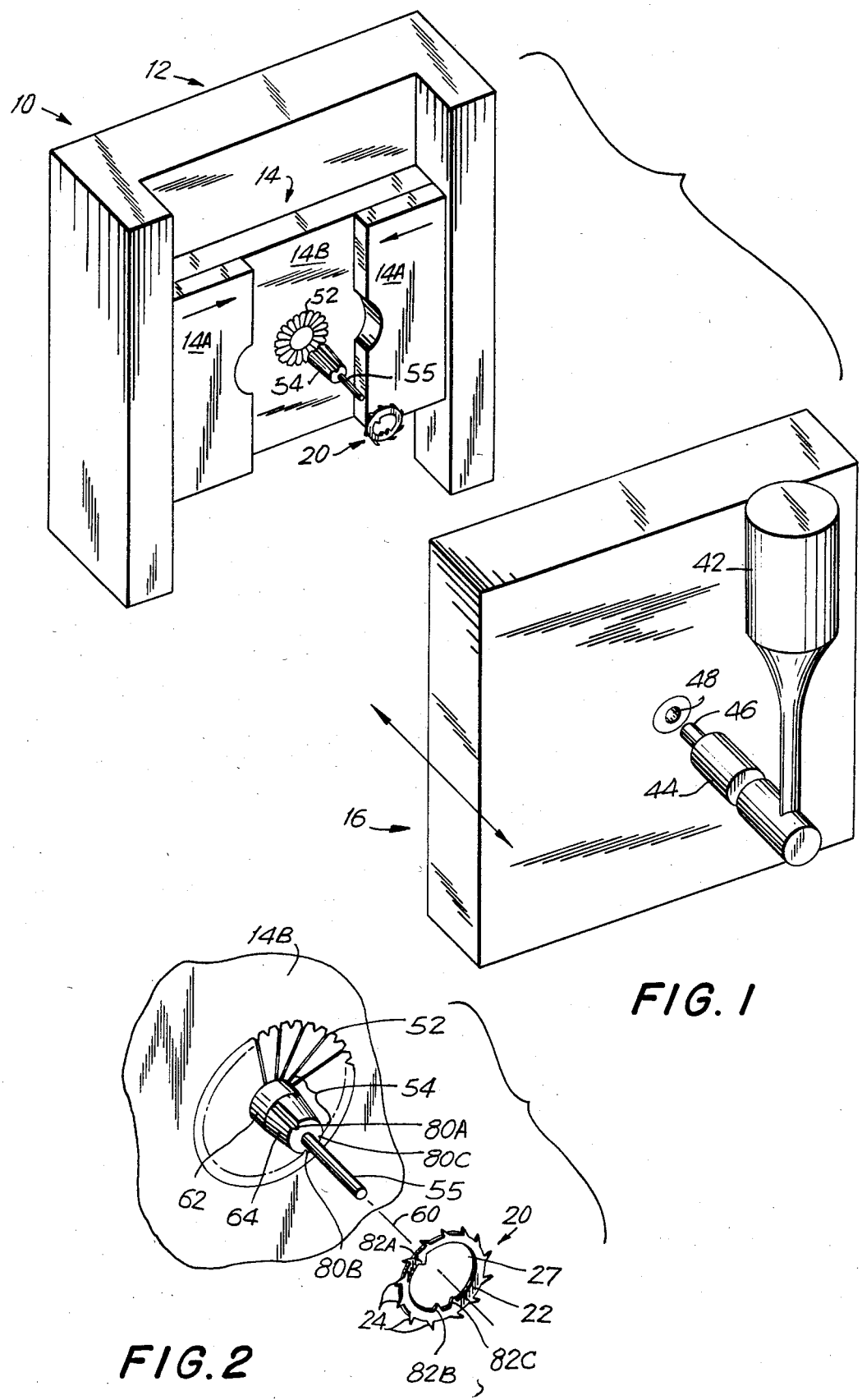
FIG. 1 is a perspective view of the molding apparatus showing the core pin and the hollow metal gear in position for mounting onto the core pin.
FIG. 2 is an enlarged view of the core pin and the hollow metal gear shown in FIG. 1.

Reference is now made in detail to the drawings in which identical or similar parts are designated by the same reference numerals throughout.

A molding machine 10 shown in perspective view in FIG. 1 includes a core portion 12 positioning a core 14 and a cavity portion 16 that is capable of being driven into operative combination with core 14 by a driver so as to form a drive gear member 18 having an axis of rotation 19 shown in FIGS. 8-11 which will be discussed in detail below. Drive gear member 18 is primarily made of plastic, but also includes a metal gear member 20 having a circular ring 22 that has angled, or tilted, gear teeth 24 on an outer rim 23 that extend outwardly from ring 22 in the direction of rotation of drive gear member 20 when mounted in a correction ribbon cassette 26 illustrated in FIG. 8 with the bottom of a housing 27 shown with the top of the housing removed. Inner rim 25 of rim 22 defines a preferably circular hole 27 formed by ring 22.

Figure 9:
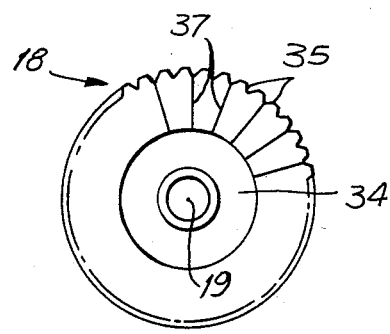
FIG. 9 is an isolated top view of the drive gear shown in FIG. 8.
Figure 10:
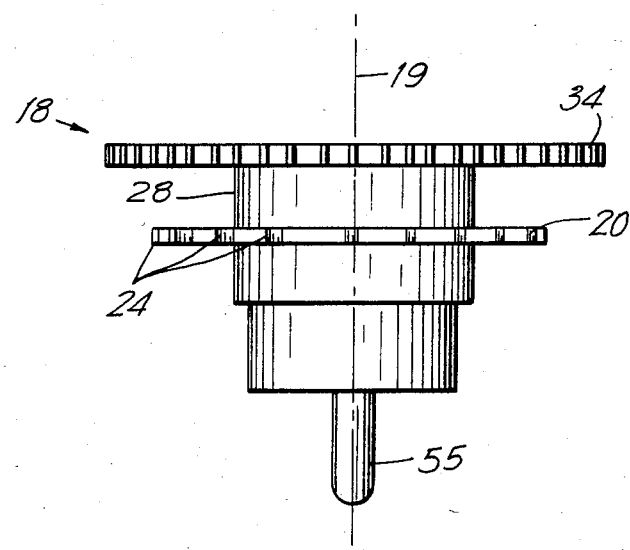
FIG. 10 is a side view of the drive gear.
Figure 11:
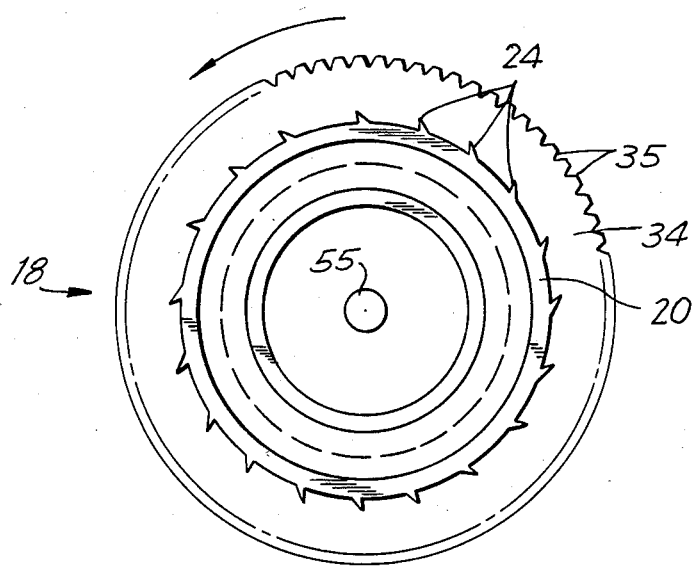
FIG. 11 is a bottom view of the drive gear.

Teeth 24 as seen in FIGS. 9-11 extend slightly beyond the outer wall of cylinder portion 28 of drive gear member 20 so that the teeth can bite into the used ribbon 30 being taken up on take-up spindle 32, which is being driven by drive gear member 20 in turn driven by a driver of a printer mechanism (not shown) that engages the plastic drive teeth of a flat end gear 34 positioned at the end of cylinder 28.

Figure 8:
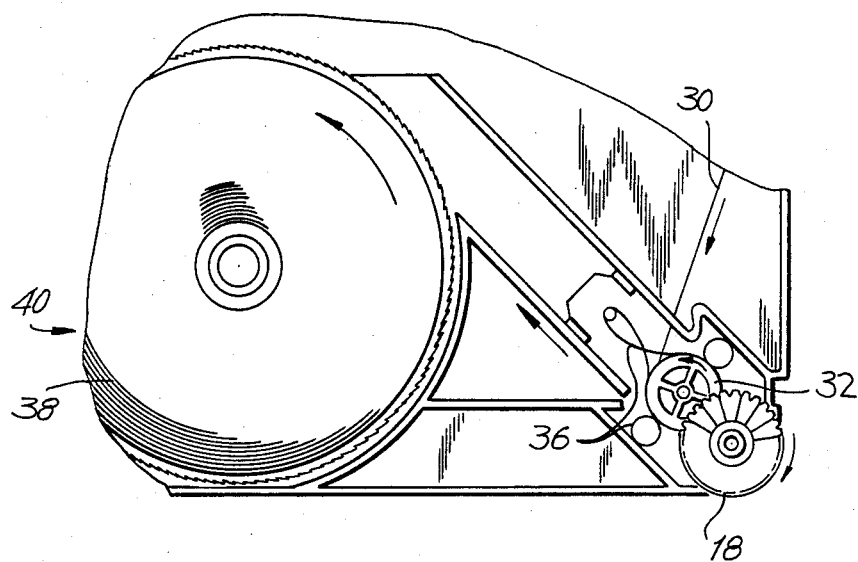
FIG. 8 is a partial top view of an IBM correctable ribbon cassette with the top of the housing removed of the trademark "EASYSTRIKE" showing the drive gear mounted in operational position.

Metal gear member 20 is spaced from a flat circular end 34 having rim teeth 36 and radial reverse-rotation stop grooves 37. Drive gear member 18 is shown in FIG. 8 positioned adjoining take-up spindle 32, which rides outwardly from drive gear 18 as used ribbon 30 builds up around take-up spindle 32 during usage. A wire spring 36 biases take-up spindle 32 into operative contact with drive gear member 18 and in particular into biting contact with teeth 24 of metal gear member 20 as take-up spindle 32 is continually pressed away from drive gear member 20 by force of the building up of used ribbon 30. Unused ribbon 38 is shown on supply spindle 40 from where it is drawn across the top (not shown) of cassette 26 for correction use then down the side of the cassette as used ribbon 30 to mounting with take-up spindle 32 and operative relationship with drive gear member 18.

Core portion 12 of molding machine 10 includes an opposed pair of slidable cores 14A that slide to a position in contact with one another except for two opposed half-cylindrical recesses forming a cylindrical cavity 15 adapted to form cylinder portion 28 of drive gear member 18 when cavity 16 has been activated to slide into contact with core portion 12 in preparation for the sending of a flow of liquid plastic from hopper 42 containing a hot liquid plastic via a barrel 44 containing a screw (not shown) and a nozzle 46 at one end that goes into a bushing 48 at the rear of cavity 16 upon activation of cavity 16. A vertical rear wall 14B of core portion 12 between slidable cores 14A forms circular stop grooves 37 at circular radial groove cavity detail 52. Power, timing, and activating mechanisms are well known in the art and are not shown.

Figure 3:
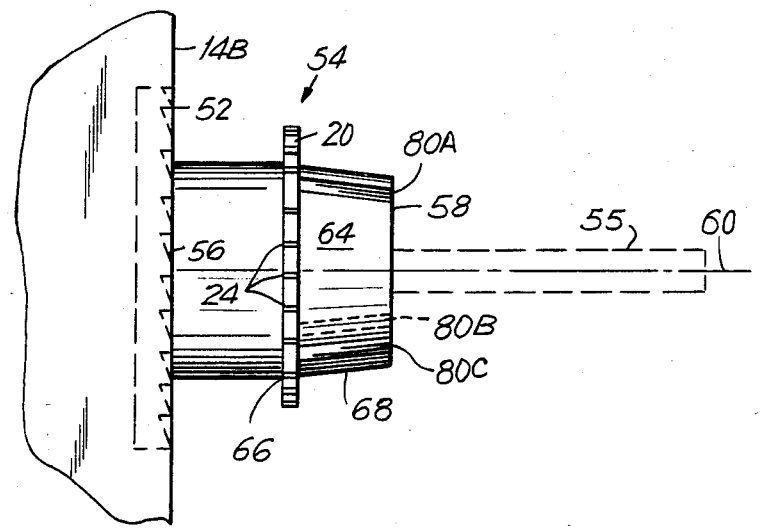
FIG. 3 is a side view of the core pin with mounted metal gear.
Figure 4:
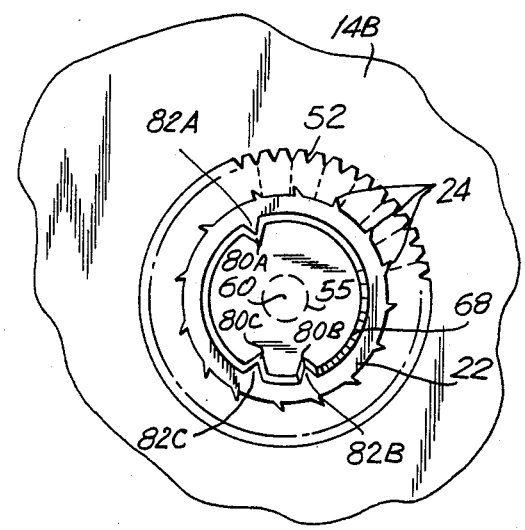
FIG. 4 is a front view of the core pin with mounted metal gear.

A generally cylindrical core pin 54 shown in FIGS. 1-4 extends horizontally from rear wall 50 axially aligned with the center of circular radial groove detail 52 at rear wall 50. An ejection pin 55 shown in FIGS. 1 and 2 extending horizontally from the pin axis 60 and in phantom lines in FIGS. 3 and 4 provides a resistance point for cavity 16 upon the completion of the molding process and movement of cavity 16 from mold 12. Core pin 54 has opposed inner and outer ends 56 and 58, respectively; inner end 56 is connected to core rear wall 12B, and outer end 58 is spaced from core rear wall 14B so as to face cavity portion 16. Pin axis 60 is perpendicular to core rear wall 14B and is aligned with axis of rotation 19 of drive gear member 18 of the formed drive gear member 18. Core pin 54 includes an inner portion 62 that extends outwardly from core rear wall 14B and inner end 56 and an outer portion 64 that is connected to inner portion 62 and extends to outer end 58. Inner portions 62 and 64 generally extend along the same length as cylinder portion 28 of drive gear member 18. Inner portion 62 is slightly larger than outer portion 64 so as to form a stop 66. It is noted that inner and outer portions 62 and 64 and hole 27 of metal gear member 20 of the preferred embodiment are generally cylindrical. Other configurations are possible.

Outer portion 64 has an outer surface that includes a taper 68 extending from a smaller diameter to larger diameter between outer end 58 and stop 66. Taper 68 can be seen in FIGS. 3 and 4. Outer portion 64 of core pin 54 is adapted to slidingly receive metal gear member 20 through hole 27 in close relationship with inner rim 25 at stop 66. It is noted here that taper 68 provides a tight fit between drive gear member 20 and outer portion 64 of core pin 54 so that drive gear member 20 does not slide loose away from core pin 54 at stop 66, a problem that could occur with the horizontal molding machine 10 described here unless taper 68 is present so that drive gear member 20 can be gradually, gently, jammed onto core pin 54.

Before proceeding with a description of the features of the invention being described, attention is directed to a prior art metal gear member 70 shown in top view in FIG. 5. Gear member 70 includes a ring 72 having a circular outer rim 74 forming a hole 75 defined by a hexagonal inner rim 76 that is adapted to be mounted upon a mating hexagonal core pin in the process of forming a drive gear member (not shown) such as drive gear member 18. The hexagonal configuration is to keep position of gear member 70 and prevent rotation during the molding process. Teeth 78 at outer rim 74 are formed and angled in the same manner as teeth 24 of metal gear member 20. It is to be noted that prior art metal gear member has a configuration at inner rim 76 that is identical when viewed in either direction, or, as will be defined herein, when viewed in mirror image. For this reason, prior art metal gear member 70 can be mounted upon the core pin in the reverse direction that is proper so that teeth 78 will be tilted in the opposite direction of the rotation of the drive gear member, thus causing take-up spindle 32 to remain immobile and generally causing a malfunction of correctable ribbon cassette 26 which cannot be repaired unless a replacement for the incorrectly manufactured drive gear member is made.

With the above discussion in mind, the present invention makes any incorrect assembly of drive gear member 18 impossible. In particular, three keyways 80A, 80B, and 80C are formed by outer portion of core pin 54 at the outer surface of outer portion 64. Keyways 80A. 80B, and 80C are each in separate planes with pin axis 60 and extend parallel with taper 68 of outer portion 64. Keyways 80A, 80B, and 80C are formed in general "V" configurations in the embodiment being described, with the base of the V being directed at core pin axis 60. Keyways 80A, 80B, and 80C extend between outer end 58 and stop 66 of core pin 54.

As shown in FIGS. 1, 2, 4 and 6, three keys 82A, 82B, and 82C extendinwardly into hole 27 of metal gear member 20. Keys 82A, 82B, and 82C are positioned at and extend radially inwardly from inner rim 25 and are capable of being slidably received by and positioned in keyways 80A, 80B, and 80C, respectively. Keys 82A, 82B, and 82C are each configured as "V"s with the point of the "V"s directed at core pin axis 60 and adapted to mate with the V keyways as described.

Keys 82A, 82B, and 82C are positioned at such angular distances from one another on inner rim 25 of metal gear member 20 that the mentioned keys are adapted to slide into keyways 80A, 80B, and 80C, wherein teeth 24 are tilted in only the direction of rotation of drive gear member 18 when positioned in cassette 26; and the mirror image of keys 82A, 82B, and 82C are not adapted to slide into, or to match with keyways 80A, 80B, and 80C. Thus, metal gear member 20 is capable of being mounted onto core pin 54 in only one direction. In particular, as seen in FIG. 6, the three keys are at different angular distance from one another, with key 82A being situated near the top of circular rim 25, key 82B being about 180° from key 82A, and key 82C being about 30° clockwise from key 82B between keys 82A and 82B. Keyways 80A, 80B, and 80C have analogous angular alignments. Thus, the mirror image of keys 82A, 82B, and 82C as shown in FIG. 6 would align keys 82A and 82B with keyways 80A and 80B but key 82C would be positioned 30° at a counter-clockwise position from key 82B and so unable to mate with keyway 80C.

Core pin 54 and inner rim 25 of metal gear member 20 can be configured other than as circles within the spirit of the invention. Likewise, the keys and keyways described can be configured as other than as V-shaped.

Keyway/keys 80A/82A; 80B,82B, and 80C/82C also act as anti-rotational stops to prevent rotational sliding of metal gear member 20 or core pin 54 in a similar manner as hexagonal inner rim 76 of prior art metal gear member 70 does when mounted on a hexagonal configured core pin.

Although the present invention has been described in some detail by way of illustration and example for purposes of clarity of understanding, it will, of course, be understood that various changes and modifications may be made in the form, details, and arrangements of the parts without departing from the scope of the invention as set forth in the following claims.

What is claimed is:

1. An improved system for molding a plastic drive gear member having a gear member having gear teeth tilted toward the direction of rotation of said drive gear member, comprising, in combination, a source of hot liquid plastic, a mold having core means and cavity means, said core means being for shaping one portion of said drive gear member, said cavity means being associated with said core means and being for combining with said core means for shaping the other portion of said drive gear member and for receiving said liquid plastic from said source of hot liquid plastic and for passing said hot liquid plastic to said core means during the molding of said drive gear member upon activation of said cavity means to combine with said core means, delivery means for passing said hot liquid plastic from said source to said cavity means upon activation of said cavity means, power means for driving said cavity means, said gear member having an inner rim forming a hole, said core means including a core pin adapted to mount said gear member in close relationship at said gear inner rim in non-rotatable alignment, first alignment means including a plurality of keyways formed in and oriented asymetrically on said core pin, and second alignment means including a plurality of keys formed on and oriented asymetrically on said gear member cooperating with said plurality of keyways during the mounting of said gear member around said core pin, said first and second alignment means being for aligning said gear member with said core member so that said gear teeth can be tilted only toward the direction of rotation of said drive gear member when said drive gear member is mounted in said cassette.

2. The system according to claim 1, said drive gear member having an axis of rotation, said core means including a rear wall, said core pin having opposed inner and outer ends, said inner end being connected to said core wall and said outer end being spaced from said core wall facing said cavity means, said core pin having a pin axis perpendicular to said core wall and aligned with said axis of rotation of said drive gear member upon formation of said drive gear member, said core pin having an outer surface, said plurality of keyways being formed at said outer surface in separate planes aligned with said pin axis extending between said outer end and a position spaced from said inner end.

3. The system according to claim 2, wherein said gear member has an outer rim, said tilted gear teeth being positioned at said outer rim, said plurality of keys being positioned at said inner rim capable of being slidably positioned in said plurality of keyways, said plurality of keys being positioned at such angular distances from one another that said plurality of keys are adapted to slide into said plurality of keyways wherein said teeth are tilted in only the direction of rotation of said drive gear member when positioned in said cassette; the mirror image of said plurality of keys being unable to match with said plurality of keyways, whereby said gear member is capable of being mounted onto said core pin in only one direction.

4. The system according to claim 1, wherein said plurality of keys and said plurality of keyways are at least three keys and three keyways, said keys and said keyways each having a three-way alignment that the three angular distances between said keys and between said keyways being different from one another, so that a mirror image of said three-way alignment of said three keys cannot be matched with said three-way alignment of said keyways.

5. The system according to claim 3, wherein said core pin includes an inner portion extending outwardly from said inner end, an outer portion connected to said inner portion and extending to said outer end, said inner portion being slightly larger than said outer portion so as to form a circular stop adapted to prevent said gear member from being moved inwardly past said inner portion during the mounting of said gear member onto said pin member.

6. The system according to claim 5, wherein said outer portion is tapered smaller diameter to larger diameter between said outer end and said stop, said gear member being pressingly engaged with said outer portion at said stop around said gear rim, whereby said gear member will not slide from said stop during the molding process.

7. The system according to claim 6, wherein said mold is a horizontal mold, said core means and said cavity means being horizontally aligned and said core pin is positioned approximately horizontally.

8. The system according to claim 7, wherein said plurality of keyways are tapered in parallel with said outer portion of said core pin.

9. The system according to claim 5, wherein said outer portion of said core pin is configured approximately as a cylinder and said gear rim is configured approximately as a circle forming a circular hole adapted to be received by said outer portion of said core pin.

10. The system according to claim 1, wherein said plurality of keys are shaped in a V-configuration and said plurality of keyways are formed as elongated V-configured grooves adapted to receive said keys in sliding, non-rotatable relationship.

11. The system according to claim 1, further including anti-rotational means for preventing rotation of said gear member upon said core pin during the molding process, wherein said anti-rotational means is said plurality of keys and said plurality of keyways.

12. The system according to claim 1, wherein said gear member is a metal gear member.

13. The system according to claim 1, wherein said drive gear member is for mounting in a correctable ribbon cassette, having a ribbon take-up spindle, said tilted gear teeth of said gear member being capable of gripping the ribbon of said take-up spindle so as to rotate said spindle.

14. The system according to claim 13, wherein said correctable ribbon cassette is an "EASYSTRIKE" International Business Machine Corporation cassette.

* * * * *